United States Patent [19]

Williams

[11] 4,175,734

[45] Nov. 27, 1979

[54] DEVICE FOR ALIGNING PLATES TO BE JOINED

[76] Inventor: Stanley B. Williams, 2088 E. Empire Lot 151, Benton Harbor, Mich. 49022

[21] Appl. No.: 918,467

[22] Filed: Jun. 23, 1978

[51] Int. Cl.² ............................................. B25B 5/14
[52] U.S. Cl. .................................................... 269/49
[58] Field of Search ...................... 269/43, 47, 49, 243, 269/289 R, 258; 29/271

[56] References Cited
U.S. PATENT DOCUMENTS

| | | | |
|---|---|---|---|
| 2,487,022 | 11/1949 | La Placa | 269/258 |
| 3,159,393 | 12/1964 | Villano | 269/49 |
| 3,875,645 | 4/1975 | Tucker et al. | 269/49 |
| 4,076,228 | 2/1978 | Sheldon | 269/49 |

Primary Examiner—Robert C. Watson
Attorney, Agent, or Firm—Gary, Juettner & Pyle

[57] ABSTRACT

A device for aligning and clamping in position a pair of plates in side by side coplanar relationship, with adjacent edges of the plates closely spaced from one another, in order that the plates may be joined along their edges, is characterized by a lower plate clamp extendable through the space between adjacent edges of the plates and under the plates into engagement with lower surfaces thereof for aligning the lower surfaces in coplanar relationship, and an upper plate clamp movable into engagement with upper surfaces of the plates for gripping the plates between the clamps. When held by the device the plates are in position to be joined along their edges, whereafter the device may be removed from the plates through the space therebetween.

3 Claims, 4 Drawing Figures

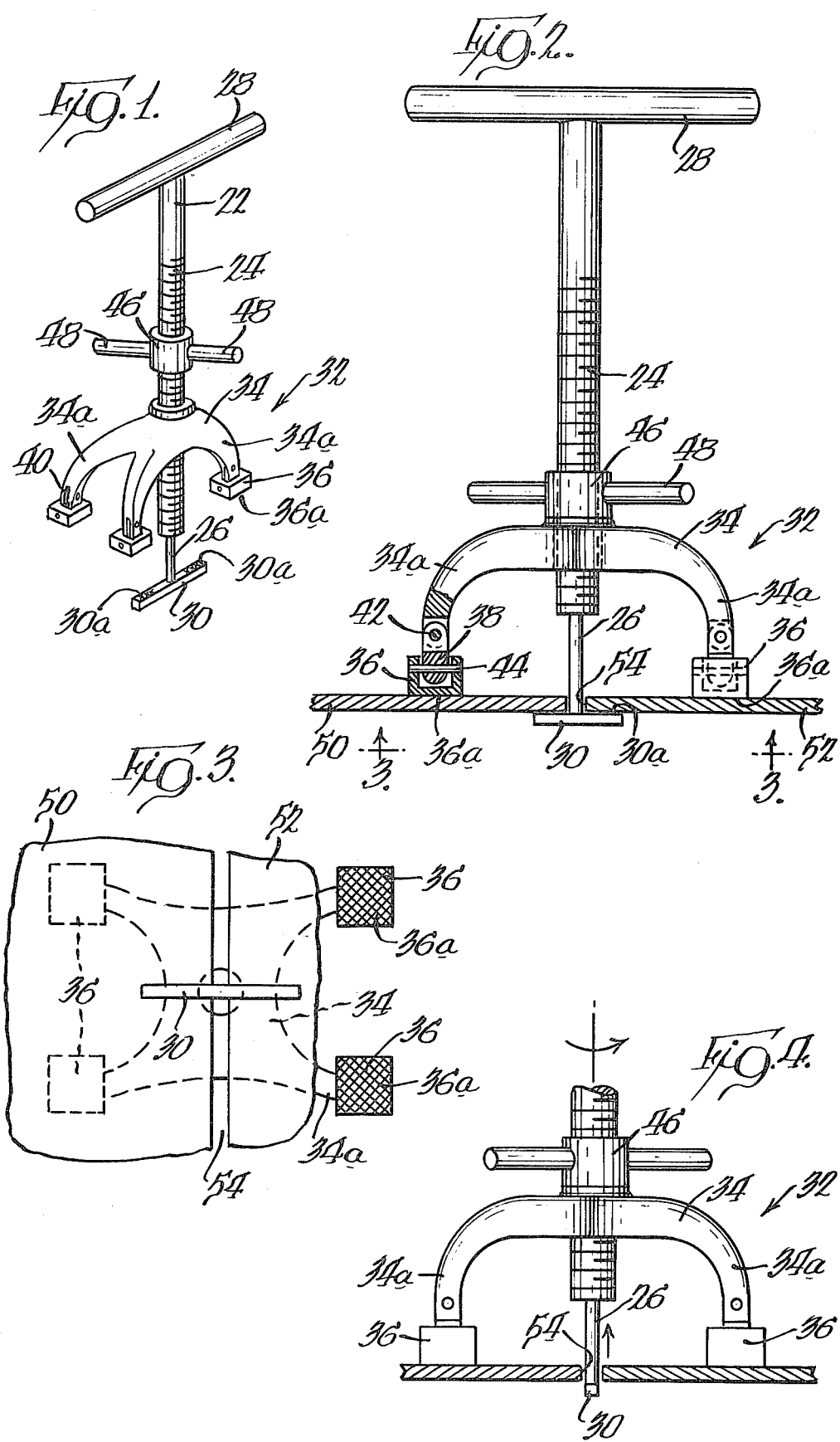

DEVICE FOR ALIGNING PLATES TO BE JOINED

BACKGROUND OF THE INVENTION

The invention relates to a device for holding a pair of plates in edge to edge coplanar alignment in order that the plates may be joined along their edges by welding or the like.

In the construction of metal walls, walkways, bulwarks and the like, separate metal plates are often joined along their edges by welding or the like to form the final structure. In order to join the plates, some means must be provided for holding the plates side by side with their adjacent edges closely spaced in order that a weld may be formed along the edges. In addition, the means for holding the plates should preferably be capable of maintaining the plates in coplanar alignment, since the plates most often are connected in such alignment.

OBJECTS OF THE INVENTION

An object of the present invention is to provide a device for supporting a pair of plates to be joined along their edges in side by side relationship with adjacent edges thereof closely spaced in order that the edges may be joined.

Another object of the invention is to provide such a device which also maintains the plates in a coplanar relationship.

A further object of the invention is to provide such a device which is easily and rapidly connectable and disconnectable with and from the plates to be supported and joined.

SUMMARY OF THE INVENTION

In accordance with the present invention, a device for positioning and releasably clamping in position a pair of plates in order that the same may be joined along adjacent edges as by welding, comprises an elongated rod having threads along at least a portion thereof and a first plate clamp connected with one end of the rod. The first clamp has a long dimension and a short dimension perpendicular thereto, and is connected with the one end of the rod generally medially of the long dimension. Also included is a second plate clamp having a body portion and at least four plate engaging legs extending therefrom and a slot formed through said body portion, and the rod extends through the slot. An adjustment means is threaded with the unthreaded portion of the rod to the side of the second clamp opposite from the first clamp, and is rotatable thereon to selectively move the second clamp along the rod toward the first clamp or to enable the second clamp to be moved away from the first clamp.

In use of the device for aligning a pair of plates, and with the plates positioned generally side by side and defining a space between adjacent edges thereof, the first clamp is extendable through the space for being positioned across one side of the plates with its long dimension extending generally perpendicular to the length of the space, and the second clamp is positionable to the other side of the plates to engage the plates with the legs extending from the body portion, the portion of the rod toward the first clamp then extending through the space. The adjustment means is then operable to move the second clamp toward the first clamp to engage the surfaces of the plates with the clamps, to align the plates in coplanar relationship, and to clamp the plates in position to enable the same to be joined along the adjacent edges thereof. After the plates have been joined, the adjustment means is then operable to release the clamps from the plates and free the first clamp for rotation with the rod to a position with its long dimension extending generally parallel to the length of the space between the plates, whereby the clamp and rod may be withdrawn from the plates through the space between the edges thereof.

The foregoing and other objects, advantages and features of the invention will become apparent from the following detailed description, when taken in conjunction with the accompanying drawings.

BRIEF DESCRIPTION OF THE DRAWINGS

FIG. 1 is a perspective view of a preferred embodiment of the device of the invention for aligning a pair of plates to be joined;

FIG. 2 is a side elevation view, partly in cross section, illustrating the device clamping a pair of plates in coplanar relationship in order that the plates may be joined along adjacent edges thereof;

FIG. 3 is a view taken substantially along the line 3—3 of FIG. 1, and illustrates the arrangement of plate clamping portions of the device, and FIG. 4 is a partial side elevation view, showing the manner in which the device is removed from the plates.

DETAILED DESCRIPTION

Referring to the drawings and in particular to FIG. 1, the device or plate clamp in accordance with the teachings of the present invention is indicated generally at 20 and is particularly suited for holding a pair of metal plates in side by side coplanar relationship, with adjacent edges thereof closely spaced, in order that the plates may be joined along their edges as by welding. The device is readily and conveniently connectable and disconnectable with the plates, and when connected automatically accomplishes the alignment function.

More particularly, the plate clamp 20 comprises an elongated rod 22 having threads 24 along a relatively large diameter medial portion thereof and a relatively narrow unthreaded extension 26. A "T" handle 28 is connected with one end of the rod for supporting and manipulating the same, and a lower plate clamp 30 is connected with the extension 26 at the other end of the rod. The lower clamp is relatively elongate and is in the shape of a bar, and has roughened or knurled plate gripping or engaging surfaces 30a at opposite ends thereof. The clamp is connected with the extension 26 generally medially of its long dimension, and has a short dimension extending generally perpendicular to the long dimension, the short dimension being no greater than the diameter of the extension 26.

To hold a pair of plates in a coplanar relationship with adjacent edges thereof closely spaced from each other in order that the edges may be joined by welding or the like, the plate clamp 20 also includes an upper plate clamp, indicated generally at 32, which is spider-like in configuration and movable along the rod 22. In particular, the upper clamp 32 has a center body portion 34 with a passage therethrough in which is received the rod 22, the passage being of sufficient diameter to enable the clamp to be slidably moved along the threaded portion 24 of the rod. Four legs 34a extend outwardly and downwardly from the body portion 34, and each has a plate engaging pad 36 at a lower end thereof for engaging upper surfaces of a pair of plates while the lower clamp 30 simultaneously engages lower surfaces of the plates, as will be described.

To accommodate for variations in the linearity of the upper surfaces of the plates, and with reference also to FIG. 2, each plate engaging pad 36 is connected with the lower end of its associated leg 34a through a link 38. Each link extends through an elongated slot 40 in its associated leg, and is pivotally joined at its upper end with the leg by means of a pin 42. The lower end of the link is received within an opening in its pad 36, and is pivotally connected therewith by a pin 44 which extends orthogonally to the pin 42. The connecting arrangement is such that each pad 36 is free for pivotal movement with respect to the lower end of its associated leg 34a along orthogonal axes, whereby a lowermost plate engaging surface 36a of each pad may be moved into generally flush engagement with an upper surface of a plate despite variations in the linearity of the surface of the plate. To facilitate gripping of the plate surface, the pad surface 36a preferably is knurled or otherwise formed with a roughened surface.

To accommodate movement of the upper and lower plate clamps 32 and 30 toward each other to grip a pair of plates therebetween and to position the plates in generally coplanar relationship with adjacent edges thereof closely spaced, in order that the edges may be joined, and to then enable separation of the upper and lower clamps so that the device 20 may be removed from the plates, an adjustment lever 46 having a pair of handles 48 is threadably engaged with the threaded portion 24 of the rod 22 to the side of the upper clamp 32 away from the lower clamp. Rotation of the adjustment lever moves the lever along the rod 22, with clockwise rotation (as viewed from above) causing movement of the upper plate clamp toward the lower clamp 30, and with counterclockwise rotation freeing the upper clamp for movement away from the lower clamp.

With reference also to FIGS. 2 and 3, in use of the plate clamp 20 to position a pair of plates 50 and 52 in coplanar relationship in order that the same may be joined along adjacent edges thereof, and with the adjacent edges defining a relatively narrow space 54 therebetween, the lower clamp 30 is positioned beneath the plates with its long dimension extending generally perpendicular to the length of the space 54 and with the rod extension 26 passing through the space, and the adjustment lever 46 is manipulated to move the upper plate clamp 32 toward the lower clamp to grip the plates therebetween. To this end, when the plates are gripped the lower plate clamp 30 aligns the lower surfaces of the plates so that the plates are in generally coplanar relationship, and the lower and upper clamps together secure the plates in fixed position so that the same may be joined together along their closely spaced adjacent edges.

To bring the plate clamp 20 into engagement with the plates, with the upper clamp 32 moved away from the lower clamp 30 the plates may be brought together to position adjacent edges thereof on opposite sides of the extension 26 above the lower clamp with the length of the lower clamp extending generally perpendicular to the length of the space 54 between the plates. The adjustment lever 46 may then be operated to move the upper and lower clamps together to grip the plates. In the alternative, with the plates 50 and 52 generally in position and defining the space 54 therebetween, the lower clamp 30 may be positioned beneath the plates by rotating the rod 22 to extend the long dimension of the clamp lengthwise of the space 54, and by then moving the lower clamp through the space to beneath the plates. Thereafter, the rod may be rotated to turn the lower clamp so that its length lies perpendicular to the length of the space, and the adjustment lever 46 operated to move the upper and lower clamps together to grip the plates therebetween.

Once the plates are held in position to be joined along their adjacent edges, they may initially be joined as by tack welding the same together at discrete positions along the edges. The tack welds may be applied at any desired number of locations, but are spaced sufficiently from each side of the rod extension 26 to define an unrestricted portion of the space 54 thereat of a length at least equal to the overall length of the lower clamp 30. In this manner, and prior to forming a continuous weld along the edges of the plate, as shown in FIG. 4, the device 20 may be removed from the tacked together plates by loosening the adjustment lever 46 to enable separation of the upper and lower clamps 32 and 30, by rotating the handle 28 and therethrough the rod 22 and the lower clamp 30 to position the lower clamp with its length extending along the length of the space 54, and then by elevating the device to remove the same from the plates. A continuous weld or seam may then be formed along the length of the edges.

Although only one plate clamp 20 has been illustrated and described, depending upon the size and weight of the plates to be joined it may be advantageous to use more than one plate clamp to support the plates in position for joining. In this case, the plate clamps would be positioned at spaced intervals along the adjacent edges of the plates. If desired, and particularly if the outer edges of the plates are not otherwise supported, one or more or alternate ones of the plate clamps may be positioned beneath the plates to provide improved lateral stability thereto.

The plate clamp of the invention thus provides a convenient and economical means for supporting a pair of plates in position to enable the same to be joined by welding or the like.

While one embodiment of the invention has been described in detail, various modifications and other embodiments thereof may be devised by one skilled in the art without departing from the spirit and the scope of the invention, as defined by the appended claims.

What is claimed is:

1. A device for positioning a pair of plates in aligned edge to edge relationship with the edges closely spaced together in order that the edges may be joined by welding or the like, comprising a first plate clamp engageable with the surfaces of the plates on one side thereof when adjacent plate edges to be joined are in closely spaced relationship; a second plate clamp engageable with the surface of the plates on the opposite sides thereof when the edges are in the closely spaced relationship, said second plate clamp comprising a main body member having at least four legs extending therefrom for engaging the other plate surfaces with ends thereof, and means for selectively moving said first and second clamps toward and away from each other to grip the plates therebetween to hold the same in position for joining the edges thereof and for releasing the plates for removal of the device therefrom, said first plate clamp being generally in the shape of a bar and having a relatively long dimension and a relatively short dimension perpendicular thereto enabling extension and retraction of said clamp to adjacent the one side of the plates through the space between the adjacent edges of the plates when said long dimension extends generally parallel to the length of the space, and enabling engagement of said first guide with the surface on the one side of the plates when said clamp is adjacent the surfaces and said long dimension extends generally perpendicular to the length of the space, and including an elongated rod, said first plate clamp being secured to one end of said rod and said second plate clamp being movable along said rod, said moving means providing for movement of said second clamp along said rod toward and away from said first clamp, said first clamp and said rod thereat being extendable through the space between the adjacent edges of the plates, said body member of said second plate clamp having a passage formed therethrough, said rod extending through said passage and being formed with threads at least along a medial portion thereof, said second clamp being movable along said rod with said passage around said rod, said moving means including an adjustment lever threadably engaged with said threaded portion of said rod and rotatable to selectively move said second clamp along said rod toward said first clamp or to enable said second clamp to be moved along said rod away from said first clamp, and further including a plate engaging pad at the end of each body member leg, each pad being pivotally connected with its associated leg for movement in orthogonal directions to accommodate uniform movement of said pad against the plate surface despite irregularities in the linearity of the surface.

2. A device for positioning and releasably clamping in position a pair of metal plates with edges thereof adjacent and closely spaced but defining a space therebetween, an elongated rod having threads formed along at least a portion thereof; a first plate clamp connected with one end of the rod, said first clamp having a long dimension and a short dimension perpendicular thereto and being connected with said one end of said rod generally medially of said long dimension; a second plate clamp having a main body member with at least four legs extending therefrom and a passage formed through said body member, said rod extending through said passage; and adjustment means threaded onto said threaded portion of said rod to the side of said second clamp opposite from said first clamp and rotatable about said rod to selectively move said second clamp along said rod toward said first clamp and to enable said second clamp to be moved along said rod away from said first clamp, said first clamp for being positioned across the surfaces of the plates on one side thereof and across the space therebetween with its long dimension extending generally perpendicular to the length of the space and said second clamp for being positioned across the surfaces of the plates on the other side thereof when the plate edges to be joined are in closely spaced relationship and with the portion of the rod toward the first clamp extending therebetween, said adjustment means then being operable to move said second clamp toward said first clamp to engage the surfaces of the plates with and between said clamps to clamp the plates in position and to align the plates in coplanar relationship for joining the edges thereof, said adjustment means then being operable after the edges are joined to unclamp the plates and free said first clamp for rotation with said rod to extend its long dimension generally along the length of the space between the plates for withdrawal of the first clamp and rod thereat from the plates through the space, and including a plate engaging pad at the end of each body member leg, each pad being pivotally connected with its associated leg for movement in orthogonal directions to accommodate uniform movement of said pad against the plate surface despite irregularities in the linearity of the surface.

3. A device for positioning a pair of plates in aligned edge to edge relationship with the edges closely spaced together in order that the edges may be joined by welding or the like, comprising a first plate clamp engageable with the surfaces of the plates on one side thereof when adjacent plate edges to be joined are in closely spaced relationship; a second plate clamp engageable with the surfaces of the plates on the opposite sides thereof when the edges are in the closely spaced relationship, said second plate clamp comprising a main body member having at least four legs extending therefrom for engaging the other plate surfaces with ends thereof, and means for selectively moving said first and second clamps toward and away from each other to grip the plates therebetween to hold the same in position for joining the edges thereof and for releasing the plates for removal of the device therefrom, and including a plate engaging pad at the end of each body member leg, each pad being pivotally connected with its associated leg for movement in orthogonal directions to accommodate uniform movement of said pad against the plate surface despite irregularities in the linearity of the surface.

* * * * *